United States Patent
Gao et al.

(10) Patent No.: US 10,215,417 B2
(45) Date of Patent: Feb. 26, 2019

(54) SEQUENTIAL COMBUSTOR ARRANGEMENT WITH A MIXER

(71) Applicant: ANSALDO ENERGIA SWITZERLAND AG, Baden (CH)

(72) Inventors: Xianfeng Gao, Niederrohrdorf (CH); Luis Tay Wo Chong Hilares, Neuenhof (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 540 days.

(21) Appl. No.: 14/795,127

(22) Filed: Jul. 9, 2015

(65) Prior Publication Data

US 2016/0010867 A1    Jan. 14, 2016

(30) Foreign Application Priority Data

Jul. 10, 2014   (EP) ..................................... 14176492

(51) Int. Cl.
*F02C 3/20*    (2006.01)
*F23R 3/34*    (2006.01)
(Continued)

(52) U.S. Cl.
CPC ............... *F23R 3/346* (2013.01); *F02C 3/20* (2013.01); *F23C 6/047* (2013.01); *F23R 3/045* (2013.01);
(Continued)

(58) Field of Classification Search
CPC .. F23R 3/346; F23R 3/045; F23R 3/34; F23R 2900/03341; F02C 3/20; F23C 6/047
See application file for complete search history.

(56) References Cited

U.S. PATENT DOCUMENTS 4,875,339 A * 10/1989 Rasmussen ............. F23R 3/045
60/757
5,277,021 A *  1/1994 Shekleton ............... F23R 3/045
60/752
(Continued)

FOREIGN PATENT DOCUMENTS

DE       10312971 A1   12/2004
FR       1 165 074 A   10/1958
(Continued)

OTHER PUBLICATIONS

European Search Report for EP Application No. 14176492.8 dated Sep. 17, 2014.

*Primary Examiner* — Carlos A Rivera
(74) *Attorney, Agent, or Firm* — Buchanan Ingersoll & Rooney PC

(57) ABSTRACT

The invention refers to a sequential combustor arrangement having a first burner, a first combustion chamber, a mixer for admixing a dilution gas to the hot gases leaving the first combustion chamber during operation, a second burner, and a second combustion chamber arranged sequentially in a fluid flow connection. The mixer includes of injection tubes pointing inwards from the side walls of the mixer for admixing the dilution gas to cool the hot flue gases leaving the first combustion chamber. A flow guide is arranged in the connecting duct and/or the injection tubes for guiding the dilution gas into the injection tubes. The invention further refers to a gas turbine and a method for operating a gas turbine with such a sequential combustor arrangement.

14 Claims, 3 Drawing Sheets

(51) Int. Cl.
*F23R 3/36* (2006.01)
*F23C 6/04* (2006.01)
*F23R 3/04* (2006.01)

(52) U.S. Cl.
CPC ................. *F23R 3/34* (2013.01); *F23R 3/36* (2013.01); *F23R 2900/00014* (2013.01); *F23R 2900/03341* (2013.01)

(56) References Cited

U.S. PATENT DOCUMENTS

| | | | |
|---|---|---|---|
| 8,161,752 B2 * | 4/2012 | Yankowich | F23R 3/005 60/752 |
| 2010/0251723 A1 | 10/2010 | Chen et al. | |
| 2014/0053566 A1 * | 2/2014 | Eroglu | F02C 7/22 60/772 |

FOREIGN PATENT DOCUMENTS

| | | |
|---|---|---|
| GB | 744 593 A | 2/1956 |
| GB | 836 117 A | 6/1960 |
| GB | 1 462 903 A | 1/1977 |
| WO | 2014/063835 A1 | 5/2014 |

* cited by examiner

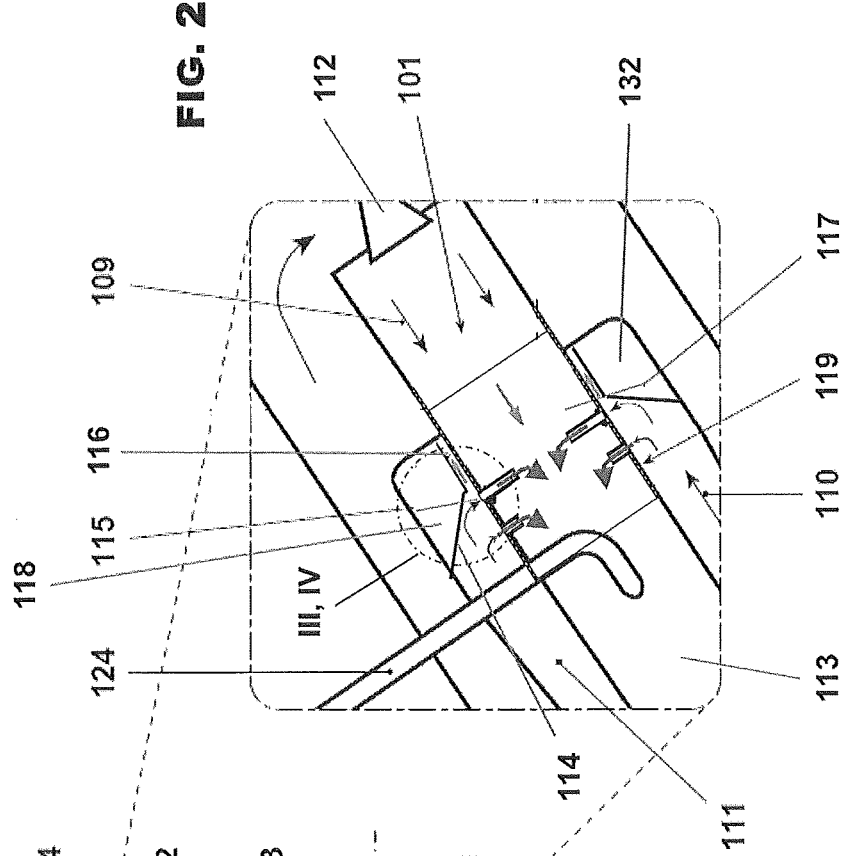
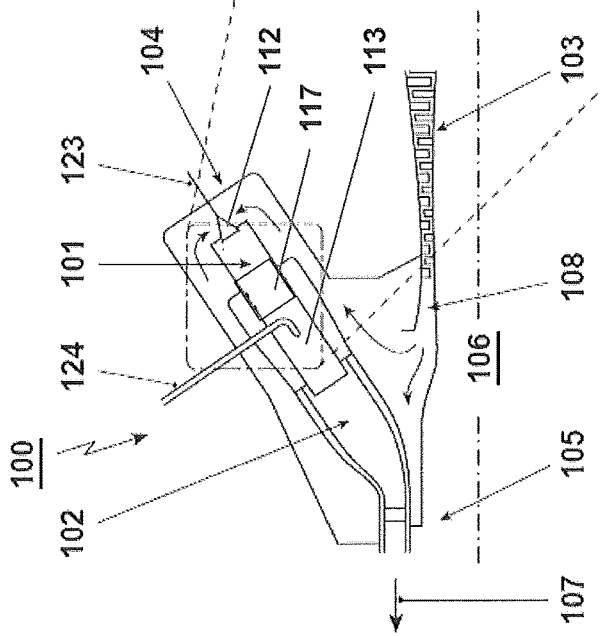
FIG. 2
FIG. 1

SEQUENTIAL COMBUSTOR ARRANGEMENT WITH A MIXER

CROSS-REFERENCE TO RELATED APPLICATIONS

This application claims priority to European Application No. 14176492.8 filed Jul. 10, 2014, the contents of which are hereby incorporated in its entirety.

TECHNICAL FIELD

The invention refers to a sequential combustor arrangement for a gas turbine with admixing dilution gas into the combustor arrangement. The invention additionally refers to a method for operating a gas turbine with admixing dilution gas into a combustor arrangement.

BACKGROUND OF THE INVENTION

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements. To further reduce emissions and operational flexibility sequential combustion has been suggested in DE 10312971 A1. Depending on the operating conditions, in particular on the hot gas temperature of a first combustion chamber it can be necessary to cool the hot gases before they are admitted to a second burner (also called sequential burner). This cooling can be advantageous to allow fuel injection and premixing of the injected fuel with the hot flue gases of the first combustor in the second burner.

Conventional cooling methods either require heat exchanger structures which lead to high pressure drops in the main hot gas flow or suggest injection of a cooling medium from the side walls. For injection of a cooling medium from the side walls a high pressure drop is required which is detrimental to the efficiency of a gas turbine operated with such a combustor arrangement and a controlled cooling of the whole flow is difficult.

With reference to WO 2014/063835 A1 a sequential combustor arrangement comprising with a mixer which is adapted to guide combustion gases in a hot gas flow path extending between a first combustion chamber and a second burner The mixer comprises a plurality of injection pipes pointing inwards from the side walls of the mixer for admixing the dilution gas to cool the hot flue gases leaving the first combustion chamber.

The mixer comprises a plurality of injection tubes pointing inwards from the side walls of the duct for the supply of the dilution gas to cool the hot flue gases leaving the first combustion chamber.

SUMMARY OF THE INVENTION

The object of the present invention is to propose a cooling and mixing enhancement in connection with a mixing section with mixer tubes for a sequential combustor arrangement. Mixer tube cooling and mixing performance are improved by the implementation of flow guide for the mixer tubes. These features would essentially help to avoid the flow separation within the mixer tubes and improve the circumferential mixing flow distribution.

A sequential combustor arrangement according to the disclosure comprises a first burner, a first combustion chamber, a mixing device for admixing a dilution gas to the hot gases leaving the first combustion chamber during operation, a second burner, and a second combustion chamber arranged sequentially in a fluid flow connection, wherein the mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner.

The mixer comprises a plurality of injection tubes (also called injection pipes), which are pointing inwards from the walls of the duct for admixing the dilution gas to cool the hot flue gases leaving the first combustion chamber to provide appropriate inlet conditions to the second burner. The sequential combustor arrangement comprises at least one group of injection tubes pointing inwards from the side walls of the mixer for admixing the dilution gas to cool the hot flue gases leaving the first combustion chamber. The injection tubes of each group are arranged circumferentially distributed along the side wall of the mixer. A duct wall at least partly encloses the side wall of the mixer thereby delimiting a connecting duct for cooling the mixer side wall and for feeding dilution gas to the injection tubes. The mixer further comprises a flow guide within the connecting duct and/or the injection tubes for guiding the dilution gas flow into the injection tubes.

The mixer concept in connection with the features of the invention is used to create the suitable sequential burner inlet profile by mixing the dilution and the cooling air with the hot gas flows from the first combustor. Generally, the mixer wall and mixer jet tubes are cooled with a convective cooling technique and/or an effusion cooling technique and/or an impingement cooling technique.

Ancillary, effusion cooling techniques are applied on the mixer because of not only good cooling of the mixer wall, but also provide mixing of the cooling air with the main hot gas flow to deliver suitable inlet hot gas profile for reheat combustion.

Accordingly, the focused object of the present invention is to propose a sequential combustor arrangement with a mixing section for dilution gas admixing between the first combustion chamber and the second burner. The dilution gas is admixed in the mixing section to provide proper inlet flow conditions for the second burner. In particular the hot gases are cooled to a predetermined temperature profile.

Additional Findings Related to the Invention:

High local inlet temperatures may result in high emissions (in particular NOx, CO, and unburned hydrocarbons) and/or flashback in the second burner. Flashback and NOx are induced by the reduced self-ignition time for the injected fuel due to a high inlet gas temperature or high oxygen concentration, which causes earlier ignition (leading to flashback) or reduced time for fuel air mixing resulting in local hot spots during combustion and consequently increases NOx emission. Low temperature regions can cause CO emissions, due to the increased self-ignition time. This can reduce the time for CO to $CO_2$ burnout, and a reduced local flame temperature, which is can further slowdown the CO to $CO_2$ burnout. Finally local hot spots may lead to overheating of certain parts downstream of the mixer.

Furthermore, in order to increase the gas turbine efficiency and performances, the temperature of the hot gases circulating through the reheat burner should be increased. Such a temperature increase causes the delicate equilibrium among all the parameters in connection with the mixer.

Further important requirements from the aerodynamic point of view are minimized pressure loss in the hot gas path and the dilution gas supply. Both can impact the performance of a gas turbine operating with such a sequential combustor arrangement. The dilution gas pressure loss can be reduced by the flow guides arranged in the connection ducts.

Typically, but without any limitation, the injection tubes allow admixing of dilution gas with a pressure drop of 0.4% to 2% of the total pressure of the dilution gas pressure before admixing. With a low pressure drop at the inlet of the injector tubes, e.g. with flow guides, a pressure drop of 0.2% to 1% of the total pressure of the dilution gas pressure before admixing can be sufficient.

The flow guide of the mixer according to one embodiment comprises a wall arranged inside the injection tube and extending along the protrusion direction of the injection tube.

The wall is arranged at a distance from the upstream end of a cross section of the injection tube with respect to the hot gas flow in the mixer. According to a further embodiment this ratio of this distance to the diameter of the injection tube is in the range of 0.2 to 0.5.

According to another embodiment of the sequential combustion arrangement the flow guide comprises a deflector which is disposed in the connection duct above the inlet of an injection tube.

According to yet another embodiment the deflector comprises a single collar-like body which spans around the mixer in circumferential direction.

The mixer is preferably arranged with a connecting duct having an annular flow section, whereas the height of the annular flow section is the difference between the diameter of a duct wall of the connecting duct and the side wall of the mixer.

The dimension of the deflector with respect to its radial height ($h_{de}$) depends on the flow cross section ($h_{p1}$) of the connecting duct.

The radial deflector height ($h_{de}$) is equal to the plenum height ($h_{p1}$) minus the height ($w_3$) of a residual flow cross section of the connecting duct. The height of the flow cross section ($h_{p1}$) of the connecting duct corresponds to ≤2.5 the diameter (D) of the injection tube which extends into the hot gas flow of the first combustor downstream of the correspondent burner. The length (L) of the tube into the hot gas flow is chosen such that good mixing of injected dilution gas with the hot gas leaving the first combustion chamber is assured.

According to one embodiment the deflector comprises a straight flank extending from the duct wall towards the mixer wall. The angle between the straight flank and the duct wall can be between 0° and 90°, preferably between 10° and 70°, and more preferably between 25° and 60°.

To optimize the flow diversion and to minimize the pressure loss of dilution gas the onset of the deflector, e.g. the straight flank is arranged above the inlet of an injection tube and shifted in flow direction of the hot gas in the mixer by a first displacement relative to the upstream end of the cross section of the injection tube in yet a further embodiment. The ratio of the first displacement to the diameter of the injection tube is in the range of 0.2 to 0.6. Alternatively or in combination the downstream end of the deflector, e.g. the straight flank, is arranged downstream an injection tube and shifted in flow direction of the dilution gas by a second displacement relative to the downstream end of the cross section of the injection tube. The ratio of the second displacement to the diameter of the injection tube is in the range of 0.1 to 0.45.

According to a further embodiment the sequential combustion arrangement comprises an end wall that encloses the side wall of the mixer section which is downstream (with respect to the cooling/dilution gas flowing in the connecting duct) of the flow guide forming an annular end duct for cooling the inlet section of the mixer, i.e. the section of the mixer where hot gases flow into the mixer. To optimize the dilution gas injection the ratio of the height of the end duct to the diameter (D) of the injection tubes in the range of 0.025 to 0.2.

According to another embodiment the sequential combustor arrangement can be comprised a mixer with a plurality of sequential disposed injection tubes with at least one deflector, which is intermediary disposed to the injection tubes or downstream of the last injection tube along the dilution gas flow, in accordance with a cascade principle, wherein for each deflector corresponding injection tubes are arranged upstream, for admixing the dilution gas to cool the hot flue gases leaving the first combustion chamber.

With a sequential arrangement the injection tubes of each group are arranged circumferentially distributed along the side wall of the mixer and wherein the first injection tubes of the first group have a first protrusion depth into the hot gas flow path, the second injection tubes of the second group have a protrusion depth, and the third injection tubes of the third group have a third protrusion depth.

In such an embodiment, but not exclusively, it may be provided that the deflector or deflection guide consists of a single sleeve-like body which is arranged in the circumferential direction of the mixer.

According to one embodiment of the sequential combustor arrangement the mixer wall is at least partly effusion cooled. Due to admixing of dilution gas the average temperature of the hot gas in the mixer is reduced downstream of the injection tubes. Typically, a reduced cooling requirement and less diffusion cooling are expected. However, due to locally increased turbulence the heat load on the side wall downstream of an injection tube can be increased.

Therefore in first effusion cooled regions downstream of first injection tube, as a single arrangement or in connection with the defector guide, and upstream of an array of a subsequent injection tube the number of effusion cooling holes per unit area can be increased.

Downstream of the last injection tube preferably in connection with a deflection guide the hot gas temperature can be reduced to a level where no effusion cooling is required or other cooling methods are applied. Thus, a subsequent region without effusion cooling can be arranged towards the exit of the mixer.

According to another embodiment the first effusion cooled region has a trapezoidal shape with bases normal to the main flow direction of the hot gases, and wherein the downstream base of the trapezoidal first region is longer than the upstream base of the trapezoidal first region.

The length of the upstream base of the trapezoidal first region can for example be in the order of 1 to 2 times the diameter of the first injection tube.

The first region can for example have the shape of an isosceles trapezoid.

In a further embodiment the effusion cooling holes have a diameter in a range from 0.5 to 1.2 mm. Further the distance between neighboring effusion cooling holes is in a range from 3 to 10 mm in the first region and in a range from 6 to 20 mm in the second region.

According to one embodiment of the sequential combustor arrangement first injection tubes are arranged upstream of further injection tubes with or without a deflection guide, when such arrangement is provided.

Such an arrangement allows the injection of dilution gas to different regions of the mixer with minimum interference between the dilution gas injected by different designed injection tubes, for example as a single tube, or as a tube with a deflection guide, or as a tube with a wall to split the dilution gas flow, or as tube with a wall to prevent flow separation.

Furthermore, when the arrangement comprising a number of injection tubes with a correspondent deflection guide, the first injection tubes can be arranged downstream of the second injection tubes. In an arrangement where the shorter injection tubes are upstream of the longer injection tubes the dilution gas injected by the short injection tubes reduces the heat load of the subsequent longer injection tubes. In particular if the long injection tubes are in the flow path of the dilution gas of an upstream injection tube the long injection tube is cooled due to a cool shower effect.

According to one embodiment of the sequential combustor arrangement the diameter of the first injection tube in connection with a deflection guide is larger than the diameter of the second injection tube. Further, in combination or as an alternative the diameter of the second injection tube can be larger than the diameter of the third injection tube.

The same designs can also be provided, if the injection tubes have a wall with different functions.

The injection tube(s) and the deflection guide of the mixer are exposed to the hot gases leaving the first combustion chamber. The tube(s) and the deflection guide are inherently cooled by the dilution gas which is flowing through them. However, to increase life time of the tube(s) and deflection guide additional measures to reduce the temperature of them can be applied.

Therefore, according to one embodiment of the sequential combustor arrangement at least part of the outer surface of the injection tube(s) and deflection guide is coated with TBC. Further, at least part of the inner surface of the side wall of the mixer can be coated with TBC to reduce the cooling requirements of the wall, and to thereby avoid cool peripheral regions in the hot gas flow leaving the mixer.

In one embodiment the heat transfer coefficient on the inside of the tube and deflection guide is increased. For increased heat transfer cooling ribs and/or a pin field can be arranged on the inner surface of the injection tube(s) and deflection guide.

In a further embodiment the injection tubes in connection with the deflection guide are inclined at an angle of less than 90° relative to the flow direction of the hot gases such that the dilution gas leaving the tubes have a flow component in the direction of the hot gas flow at the location of injection.

The injection tubes can be inclined at an angle such that the axial component of the dilution gas leaving the tubes is equal to or within +1-50% of the axial flow velocity of the hot gas flow at the location of injection.

Besides, the sequential combustor arrangement a gas turbine comprising such a sequential combustor arrangement is subject of the present disclosure. Such a gas turbine comprises at least a compressor, a sequential combustor arrangement with a first burner, a first combustion chamber, a mixing device for admixing a dilution gas to the hot gases leaving the first combustion chamber during operation, a second burner, and a second combustion chamber arranged sequentially in fluid flow connection, wherein the mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner, and at least one turbine.

Besides, the gas turbine a method for operating such a gas turbine is subject of the present disclosure. Dilution gas can be admixed to the hot gases in the mixer such that the hot gases are cooled. According to one embodiment dilution gas is admixed into different regions of the cross section of the mixer via the various injection tubes.

In one embodiment the first injection tubes are arranged to admix dilution gas towards the central region of the hot gas flow path.

According to a further embodiment of the method for operating a gas turbine the dilution gas is feed through the connection duct with a first flow velocity, injected in the gas flow from the injection tubes with a second flow velocity. The ratio of second flow velocity to first flow velocity can be in the range of 2 to 10. More specifically it can also be in the range of 3 to 8 to avoid high pressure loses.

In yet a further embodiment of the method the dilution gas is feed through the connection duct with a first flow velocity, and a residual flow is feed through an end duct which is delimited by an end wall that is partly enclosing the side wall at a hot gas inlet region of the mixer with a third flow velocity. The ratio of third flow velocity to first flow velocity can be in the range of 0.3 to 3.

Effusion cooling might be used to cool the combustor walls and/or side walls of the mixing section.

The first combustion chamber and the second combustion chamber may be arranged in a can-can-combustor architecture, i.e. the first combustion chamber and second combustion chamber are can-combustion chambers.

The first combustion chamber and the second combustion chamber may be arranged in a can-annular-combustor architecture, i.e. the first combustion chamber is arranged as an annular combustion chamber and second combustion chamber is arranged as can-combustion chamber.

The first combustion chamber and the second combustion chamber may be arranged in an annular-can-combustor architecture, i.e. the first combustion chamber is arranged as can combustion chamber and second combustion chamber is arranged as an annular combustion chamber.

The first combustion chamber and the second combustion chamber may be arranged in an annular-annular-combustor architecture, i.e. the first combustion chamber and second combustion chamber are annular combustion chambers.

BRIEF DESCRIPTION OF THE FIGURES

The disclosure, its nature as well as its advantages, shall be described in more detail below with the aid of the accompanying figures. Referring to the figures:

FIG. 1 shows a generic gas turbine using sequential combustion with a mixer for admixing dilution gas;

FIG. 2 shows a sequential combustor arrangement with a mixer with an injection tube in connection with a flow guide;

DETAILED DESCRIPTION

Figure 3:
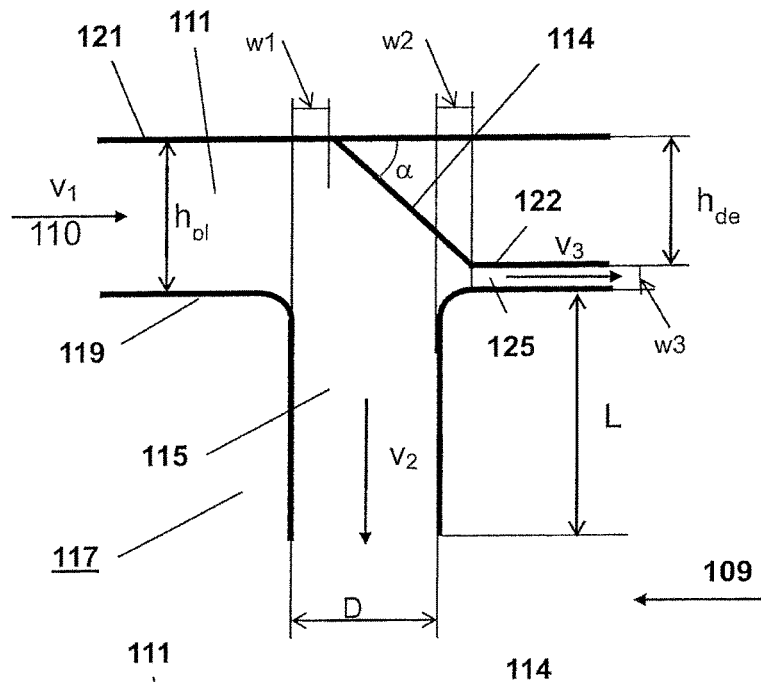
FIG. 3 shows an example of a deflector arranged in a connecting duct for feeding dilution gas into an injection tube in more detail.

FIG. 1 shows a gas turbine engine 100 with a sequential combustor arrangement 104 according to the disclosure. It comprises a compressor 103, a sequential combustor arrangement 104, and a turbine 105. The sequential combustor arrangement 104 comprises a first burner 112, a first combustion chamber 101, and a mixer 117 for admixing a dilution gas to the hot gases leaving the first combustion chamber 101 during operation (see FIG. 2).

Downstream of the mixer 117 the sequential combustor arrangement 104 further comprises a second burner 113, and a second combustion chamber 102. The first burner 112, first combustion chamber 101, mixer 117, second burner 113 and second combustion chamber 102 are arranged sequentially in a fluid flow connection. Fuel can be introduced into the first burner 112 via a first fuel injection 123, mixed with compressed air which is compressed in the compressor 103, and combusted in the first combustion chamber 101. Dilution gas is admixed in the subsequent mixer 117. Additional fuel can be introduced into the second burner via a second fuel injection 124, mixed with hot gases leaving the mixer 117, and combusted in the second combustion chamber 102. The hot gases leaving the second combustion chamber 102 are expanded in the subsequent turbine 105, performing work. The turbine 105 and compressor 103 are arranged on a shaft 106.

The remaining heat of the exhaust gas 107 leaving the turbine 105 can be further used in a heat recovery steam generator or boiler (not shown) for steam generation.

In the example shown here compressor exit gas is admixed as dilution gas. Typically compressor exit gas is compressed ambient air. For gas turbines with flue gas recirculation (not shown) the compressor exit gas is a mixture of ambient air and recirculated flue gas.

Typically, the gas turbine system includes a generator (not shown) which is coupled to a shaft 106 of the gas turbine 100.

FIG. 2 shows an exemplary embodiment of a mixer 117 as an enlarged section of the FIG. 1. In this example compressed gas 108 from the compressor plenum (see FIG. 1, downstream of compressor 103) is guided along the combustor liner in a connection duct 111 as dilution gas 110. From the connection duct 111 the dilution gas 110 is injected into the mixer 117 via an injection tube 115 in connection with a deflector or deflection guide 114. The mixer 117 has a cross section with a height adapted to the flow conditions The mixer 117 can be arranged with an annular cross section. For an annular mixer the height is the difference between the diameter of the duct wall 121 of the annular flow section and the side wall 119 of the annular flow section. For a mixer or mixer arrangement with a cylindrical cross section the height is the diameter of the cross section.

The length L of the injection tubes 115 is chosen such that good mixing of injected dilution gas 110 with the hot gas leaving the first combustion chamber 101 (see FIG. 1) is assured. The deflector 114 consists of a single collar-like body which is arranged in the circumferential direction of the mixer, and the deflector 114 is inclined at an angle of less than 90° relative to the flow direction of the dilution gas 110.

The volume 118 between the deflector and the plenum wall can be as a damper for damping combustion pulsation. For damping the volume 118 can be connected the hot gas flow 109 by neck (not shown) in the mixer 117 or to the first combustion chamber 101. The volume 118 can be divided into several smaller volumes the resonating frequency of the damper.

FIG. 3 shows the deflector 114 of region III, IV from FIG. 2 in more detail. The deflector 114 with a straight flank is arranged above the inlet of an injection tube 115. The deflector 114 is extending from the duct wall 121 wherein the onset of the deflector is shifted in flow direction of the dilution gas 110 by a first displacement $w_1$ relative to the upstream end of the cross section of the injection tube 115. The straight flank of the deflector extends beyond a downstream end of cross section of the injection tube 115 and shifted in flow direction of the dilution gas 110 by a second displacement $w_2$ relative to the downstream end of the cross section of the injection tube 115.

Downstream the deflector 114 the side wall 119 of the mixer 117 is enclosed by an end wall 122 forming an annular end duct 125 for cooling the inlet section of the mixer 117.

The height $h_{de}$ dimension of the deflector 114 with respect to its radial height $h_{de}$ of the connecting duct 111 depends on the flow cross section $h_{pl}$ of the connecting duct.

Figure 4A:
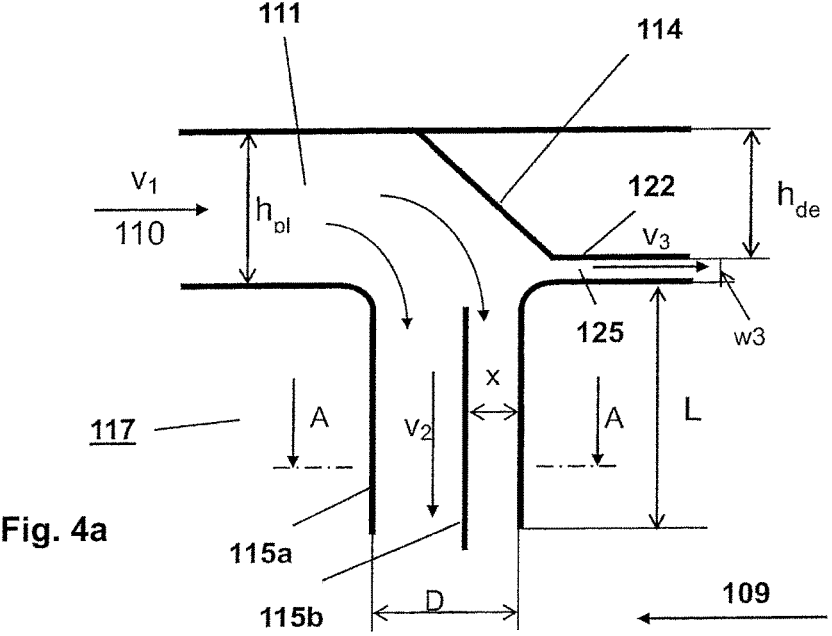
FIG. 4a shows another example of a deflector arranged in a connecting duct for feeding dilution gas into an injection tube in more detail, wherein the injection tube comprises a wall for guiding the flow into the injection pipe
Figure 4B:
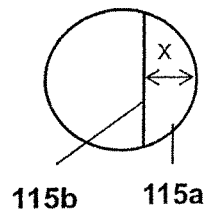
FIG. 4b shows a cross section A-A of the injection tube with a wall.

FIG. 4 is based on FIG. 3. In addition in the example of FIG. 4 the injection tube 115a of the mixer 117 comprises a wall 115b arranged along the whole longitudinal direction of the injection tube 115a; this wall being located outside or quasi-outside the center of the cross section of the injection tube 115a. This arrangement may be provided in connection with a single injection tube or affect in conjunction with the above described deflector 114. Accordingly, the wall 115b divides the injection tube 115a into two sections. This might avoid the flow separation inside the injection tube 115a. The distance x of the wall 115b to the inner surface of the injection tube 115a at the upstream end of the injection tube relative to the hot gas flow in the mixer has a value x=0.1 D to 0.5 D (D=diameter of the injection tube). The cross section A-A of the injection tube 115a with a wall 115b is shown in FIG. 4a. In this example the injection tube 115 has a circular cross section, and the wall 115b is planar extending a first intersection point of a straight line with the circular wall of the injection tube 115a to the second intersection point of the straight line with the circular wall of the injection tube 115a. The plane of the wall 115b is normal to the flow direction of the dilution gas 110 in the connecting duct 111. The injection tube can also have a non-circular cross section as for example elliptical, or drop shaped, or have an aerodynamic profile to reduce the pressure drop in the hot gas flow or to guide the hot gas flow. The wall 115b extending inside the injection tube 115b is not limited to a planar wall but can also have for example a curved or arc like cross section.

Figure 5:
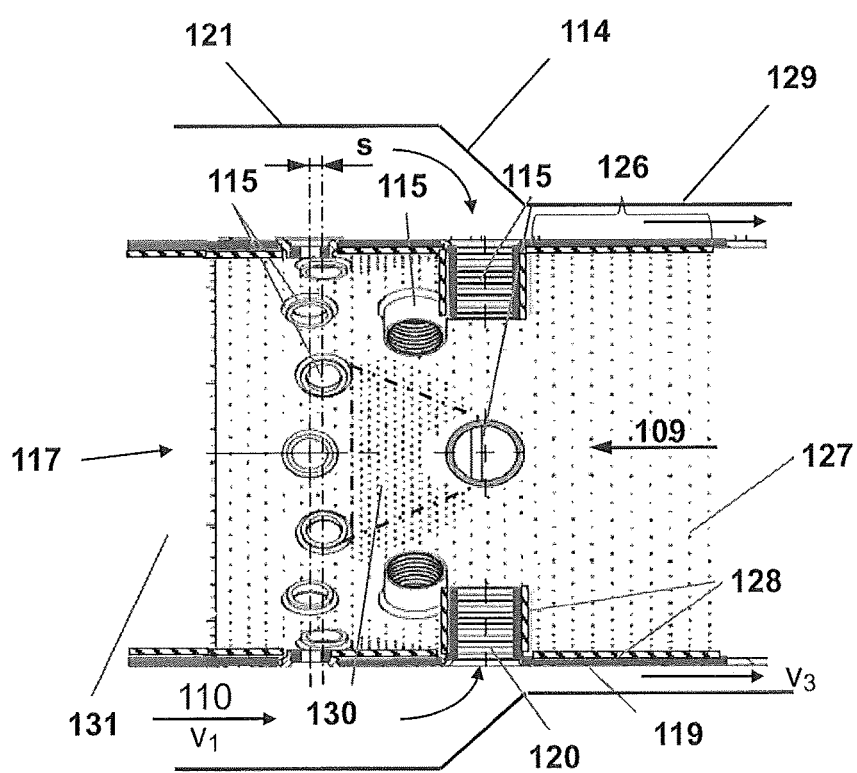
FIG. 5 shows a section of a mixer in an annular architecture with effusion cooling.

FIG. 5 shows an example of a section of mixer 117 in a can-combustor architecture. It shows a cut-out of a cylindrical side wall 119. The injection tubes 115 are arranged in groups on the cylindrical side wall 119, with respect to the main flow direction of the hot gas 109. Neighbouring injection tubes 115 in circumferential direction are staggered by a stagger in direction of the main flow direction of the hot gas 109 relative to a plane normal to the hot gas flow direction, wherein the stagger is between 0.1 and 3.5 times the diameter of the injection tubes. An arrangement of sequential disposed groups of injection tubes 115 along the main flow direction of the hot gas 109 can be provided.

The inlet to the injection tubes 115 is rounded to reduce the pressure loss of the dilution gas entering the injection tubes 115 (see FIGS. 2-4).

The side wall 119 of the mixer is effusion cooled. Effusion cooling holes 127 are distributed over a large area of the side wall 119. A trapezoidal first region 130 downstream of each first injection tube 115 (in flow direction). A homogeneously cooled second region 126 the wall extends upstream of the first group of injection tubes 115. The first region 130 has an increased density of effusion cooling holes 127 relative to the second region 126. The first region 130 has the shape of an isosceles trapezoid. The shorter base extends in a direction normal to the main flow direction of the hot gas 109 in both directions from the centre of the first injection tube 115. The legs of the trapezoid typically have an angle of about 30° to 45° relative to the main flow direction of the hot gas 109. In this example the first region 130 extends in the main flow direction of the hot gas 109 to the upstream side of subsequent injection tubes 115.

Downstream of the last injection tubes 115 the hot gas temperature can be reduced to a level where no diffusion cooling is required or other cooling methods are applied. A third region 131 without effusion cooling is shown arranged towards the exit of the mixer 117.

The effusion cooling holes 127 can have a diameter in a range from 0.5 to 1.2 mm, wherein the distance between neighboring effusion cooling holes 127 can be in a range from 3 to 10 mm in the first region 130 and in a range from 6 to 20 mm in the second region 126.

The inner surface of the side wall 119 is protected by thermal barrier coating 128. In addition the outer surface of the injection tubes 115 is protected by thermal barrier coating 128.

Ribs 120 are applied on the inner surface of the injection tube 115 to increase the heat transfer for better cooling of the injection tube 115.

All the explained advantages are not limited just to the specified combinations but can also be used in other combinations or alone without departing from the scope of the disclosure. Other possibilities are optionally conceivable, for example, for deactivating individual burners or groups of burners. Further, the dilution gas can be re-cooled in a cooling air cooler before admixing in the mixer. Further different combinations of flow guides 114, 115b are possible, e.g. a group of injection tubes with walls 115b as flow guides can be followed (i.e. in the direction of the dilution gas 110 in the connecting duct 111) by a group of injection tubes 115 with a deflector 114 disposed in the connection duct 111 above the injection tube inlets.

The invention claimed is:

1. A sequential combustor arrangement, comprising:
a first burner;
a first combustion chamber;
a mixer for admixing a dilution gas to hot gases leaving the first combustion chamber during operation;
a second burner; and
a second combustion chamber arranged sequentially in a fluid flow direction, wherein the mixer is adapted to guide the hot gases in a hot gas flow path extending between the first combustion chamber and the second burner, the mixer including:
a duct having an inlet at an upstream end adapted for connection to the first combustion chamber and an outlet at a downstream end adapted for connection to the second burner;
at least one group of injection tubes extending inwards from a side wall of the mixer into the hot gas flow path for admixing the dilution gas to cool the hot gases leaving the first combustion chamber wherein the at least one group of injection tubes are arranged circumferentially distributed along the side wall of the mixer;
a duct wall at least partly encloses the side wall delimiting a connecting duct for feeding the dilution gas to the at least one group of injection tubes; and
a flow guide arranged in the connecting duct and/or the at least one group of injection tubes for guiding the dilution gas into the at least one group of injection tubes, wherein the flow guide includes a deflector disposed in the connecting duct above an inlet of an injection tube of the at least one group of injection tubes, and
an onset of the deflector is arranged above an inlet of the injection tube and shifted in a flow direction of the dilution gas by a first displacement ($w_1$) relative to an upstream end of a cross section of the injection tube wherein a ratio of the first displacement ($w_1$) to a diameter (D) of the injection tube is in a range of 0.2 to 0.6 and/or that a downstream end of the deflector is arranged shifted in the flow direction of the dilution gas by a second displacement ($w_2$) relative to a downstream end of the cross section of the injection tube wherein a ratio of the second displacement ($w_2$) to the diameter (D) of the injection tube is in a range of 0.1 to 0.45.

2. The sequential combustion arrangement according to claim 1, wherein the flow guide comprises:
a tube wall arranged inside each injection tube of the at least one group of injection tubes and extending along a protrusion direction of the injection tube.

3. The sequential combustion arrangement according to claim 2, wherein the tube wall is arranged at a distance (x) from an upstream end of a cross section of each injection tube with respect to a flow direction of the hot gases in the mixer and wherein a ratio of the distance (x) to a diameter (D) of each injection tube is in a range of 0.2 to 0.5.

4. The sequential combustion arrangement according to claim 1, wherein the deflector comprises:
a single collar-like body which spans around the mixer in a circumferential direction.

5. The sequential combustion arrangement according to claim 1, wherein a height of a cross section ($h_{pl}$) of the connecting duct is less or equal to 2.5 a diameter (D) of an injection tube of the at least one group of injection tubes.

6. The sequential combustion arrangement according to claim 1, wherein the deflector comprises:
a straight flank extending from the duct wall towards the side wall with an angle ($\alpha$) between the straight flank and the duct wall between 1° and 90°.

7. The sequential combustion arrangement according to claim 3, wherein downstream of the flow guide the side wall of the mixer is enclosed by an end wall forming an annular end duct for cooling an inlet section of the mixer wherein the ratio of the height ($w_3$) of the end duct to the diameter (D) of each injection tube is in the range of 0.025 to 0.2.

8. The sequential combustor arrangement according to claim 1, wherein at least part of the outer surface of each injection tube of the at least one group of injection tubes and/or at least part of the inner surface of the side wall of the mixer is coated with TBC.

9. The sequential combustor arrangement according to claim 1, comprising:
cooling ribs and/or a pin field arranged on each inner surface of the at least one group of injection tubes.

10. A gas turbine engine with at least one compressor, a combustor, and at least one turbine; the gas turbine engine, comprising:
a sequential combustor arrangement according to claim 1.

11. A method for operating a gas turbine with at least one compressor, a sequential combustor arrangement including a first burner, a first combustion chamber, a mixer for admixing a dilution gas to the hot gases leaving the first combustion chamber during operation, a second burner, and a second combustion chamber arranged sequentially in a fluid flow direction, wherein the mixer is adapted to guide the hot gases in a hot gas flow path extending between the first combustion chamber and the second burner, the mixer including a duct having an inlet at an upstream end adapted for connection to the first combustion chamber and an outlet at a downstream end adapted for connection to the second burner, at least one group of injection tubes extending inwards from the side walls of the mixer into the hot gas flow path for admixing the dilution gas to cool the hot gases leaving the first combustion chamber, wherein the at least one group of injection tubes are arranged circumferentially distributed along the side wall of the mixer, the method comprising:
feeding dilution gas through a connecting duct which is delimited by a duct wall that is at least partly enclosing the side wall; and
diverting the dilution gas from the connection duct into the at least one group of injection tubes by a flow guide which is arranged in the connecting duct and/or the at least one group of injection tubes, wherein the flow guide includes a deflector disposed in the connecting duct above an inlet of an injection tube of the at least one group of injection tubes, and
an onset of the deflector is arranged above an inlet of the injection tube and shifted in a flow direction of the dilution gas by a first displacement ($w_1$) relative to an upstream end of a cross section of the injection tube wherein a ratio of the first displacement ($w_1$) to a diameter (D) of the injection tube is in a range of 0.2 to 0.6 and/or that a downstream end of the deflector is arranged shifted in the flow direction of the dilution gas by a second displacement ($w_2$) relative to a downstream end of the cross section of the injection tube wherein a ratio of the second displacement ($w_2$) to the diameter (D) of the injection tube is in a range of 0.1 to 0.45.

12. The method for operating a gas turbine according to claim 11, comprising:
feeding dilution gas through the connection duct with a first flow velocity ($v_1$); and
injecting dilution gas in the hot gas flow from the at least one group of injection tubes with a second flow velocity ($v_2$), wherein the ratio of second flow velocity ($v_2$) to first flow velocity ($v_1$) is in the range of 2 to 10.

13. The method for operating a gas turbine according to claim 11, comprising:
feeding dilution gas through the connection duct with a first flow velocity ($v_1$); and
feeding a residual flow through an end duct which is delimited by an end wall that is partly enclosing the side wall at a hot gas inlet region of the mixer with a third flow velocity ($v_3$), wherein the ratio of third flow velocity ($v_3$) to first flow velocity ($v_1$) is in the range of 0.3 to 3.

14. A sequential combustor arrangement, comprising:
a first burner;
a first combustion chamber,
a mixer for admixing a dilution gas to hot gases leaving the first combustion chamber during operation;
a second burner; and
a second combustion chamber arranged sequentially in a fluid flow direction, wherein the mixer is adapted to guide the hot gases in a hot gas flow path extending between the first combustion chamber and the second burner, the mixer including:
a duct having an inlet at an upstream end adapted for connection to the first combustion chamber and an outlet at a downstream end adapted for connection to the second burner;
at least one group of injection tubes extending inwards from a side wall of the mixer for admixing the dilution gas to cool the hot gases leaving the first combustion chamber wherein the injection tubes are arranged circumferentially distributed along the side well of the mixer;
a duct wall at least partly encloses the side wall delimiting a connecting duct for feeding the dilution gas to the at least one group of injection tubes; and
a flow guide arranged in the connecting duct and/or the at least one group of injection tubes for guiding the dilution gas into the at least one group of injection tubes;
wherein the flow guide includes a deflector disposed in the connecting duct above an inlet of an injection tube of the at least one group of injection tubes; and
an onset of the deflector is arranged above an inlet of the injection tube and shifted in a flow direction of the dilution gas by a first displacement ($w_1$) relative to an upstream end of a cross section of the injection tube wherein a ratio of the first displacement ($w_1$) to a diameter (D) of the injection tube is in a range of 0.2 to 0.6 and/or that a downstream end of the deflector is arranged shifted in flow direction of the dilution gas by a second displacement ($w_2$) relative to a downstream end of the cross section of the injection tube wherein a ratio of the second displacement ($w_2$) to the diameter (D) of the injection tube is in a range of 0.1 to 0.45.

* * * * *